March 3, 1964    R. BAVERSTOCK    3,123,451
LPG FUEL SYSTEM FOR INTERNAL COMBUSTION ENGINES
Filed Oct. 16, 1959    4 Sheets-Sheet 1
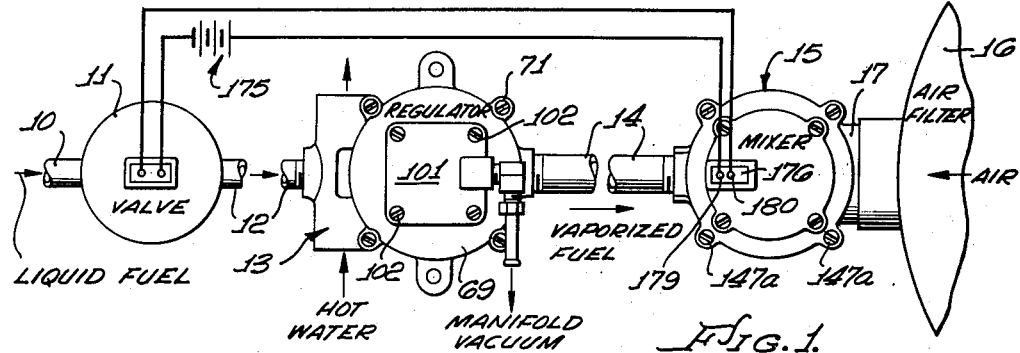
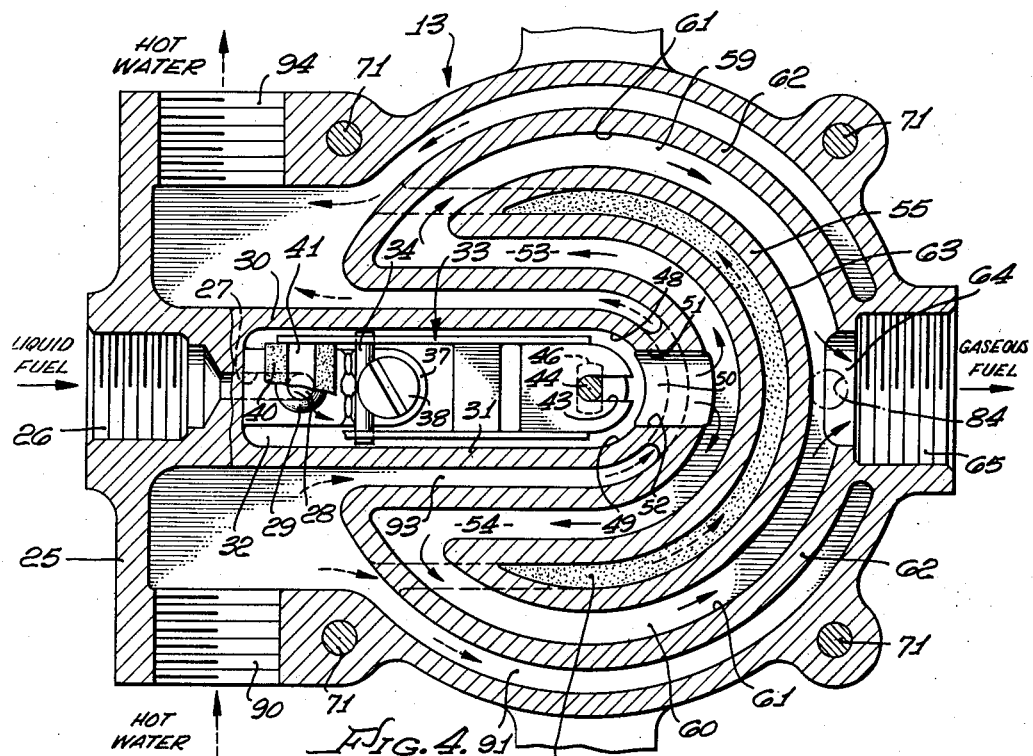
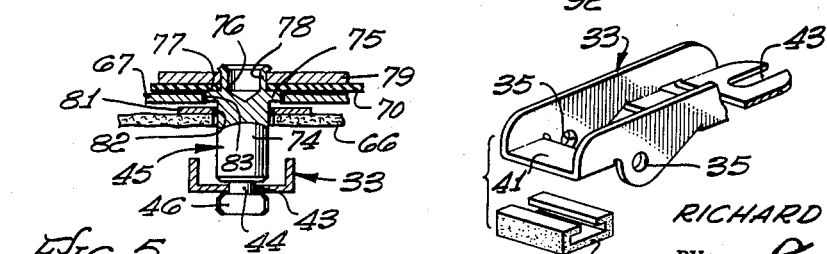
INVENTOR.
RICHARD BAVERSTOCK
BY Lyon & Lyon
ATTORNEYS.

March 3, 1964 R. BAVERSTOCK 3,123,451
LPG FUEL SYSTEM FOR INTERNAL COMBUSTION ENGINES
Filed Oct. 16, 1959 4 Sheets-Sheet 2
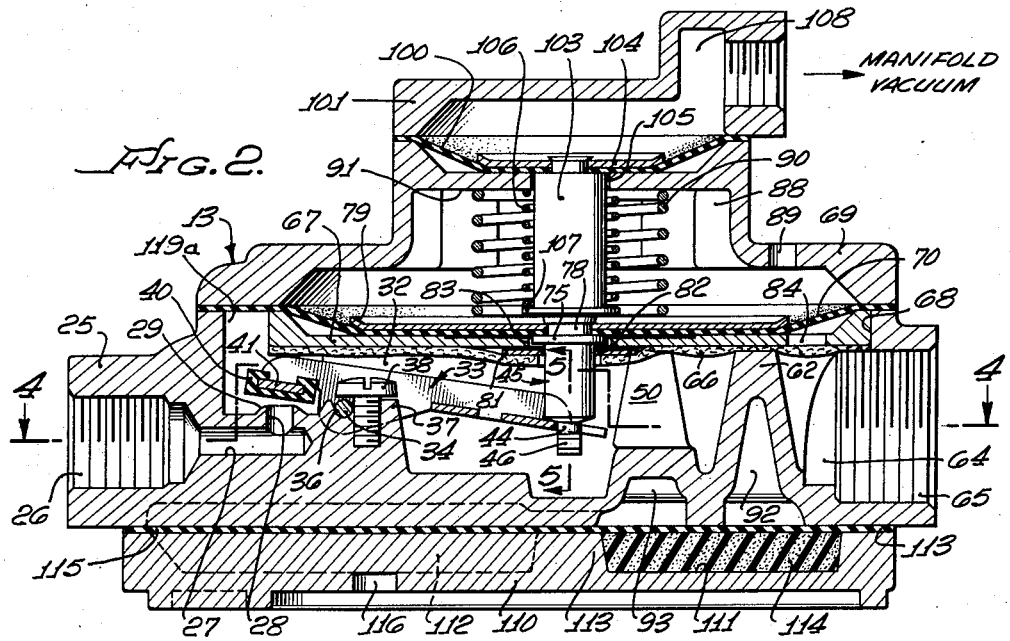
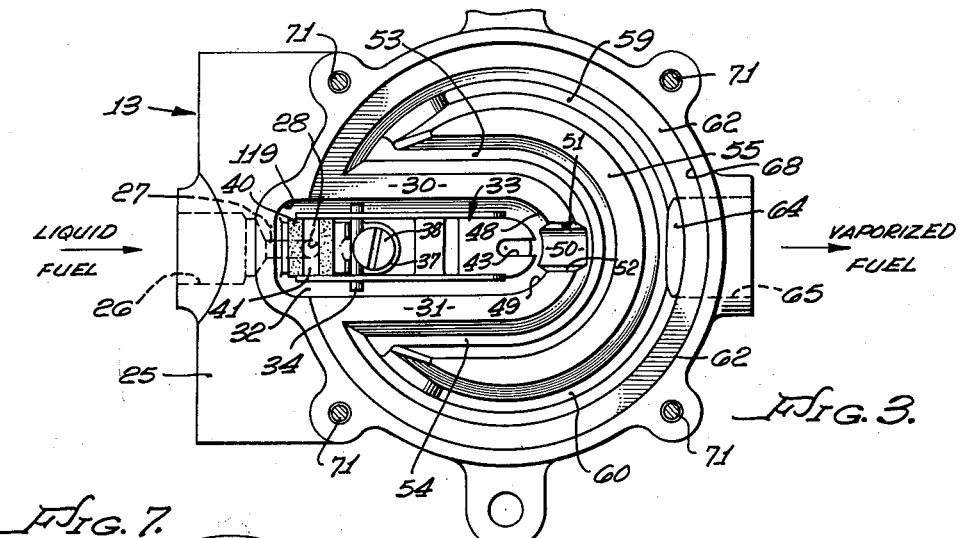
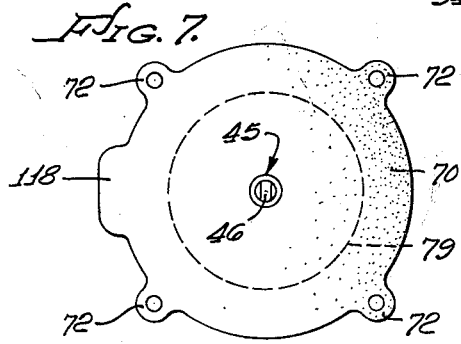
INVENTOR.
RICHARD BAVERSTOCK
BY
Lyon & Lyon
ATTORNEYS.

March 3, 1964 R. BAVERSTOCK 3,123,451
LPG FUEL SYSTEM FOR INTERNAL COMBUSTION ENGINES
Filed Oct. 16, 1959 4 Sheets-Sheet 3
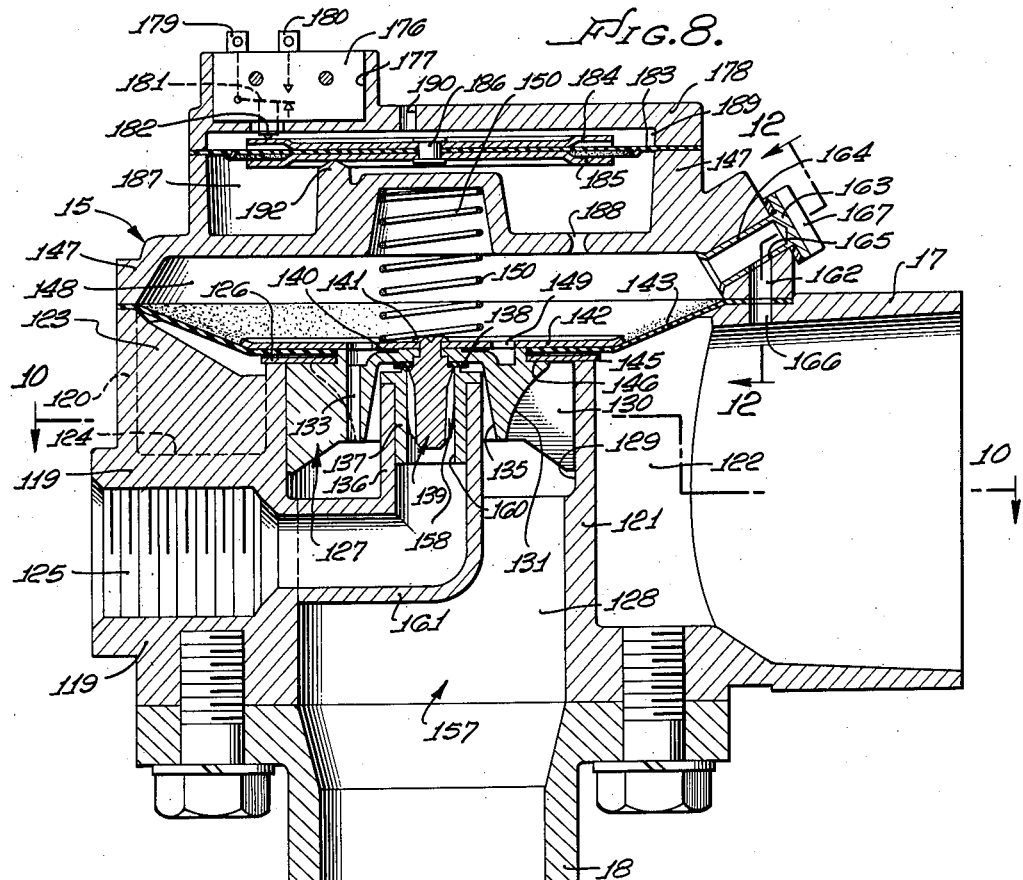
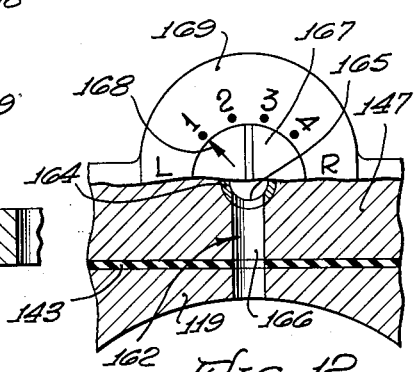
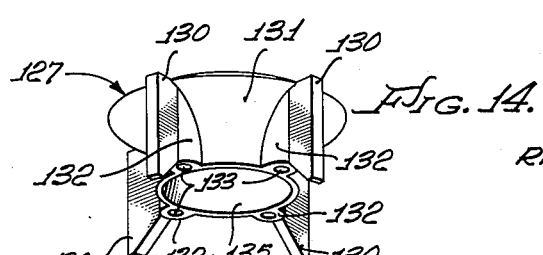
INVENTOR.
RICHARD BAVERSTOCK
BY
ATTORNEYS.

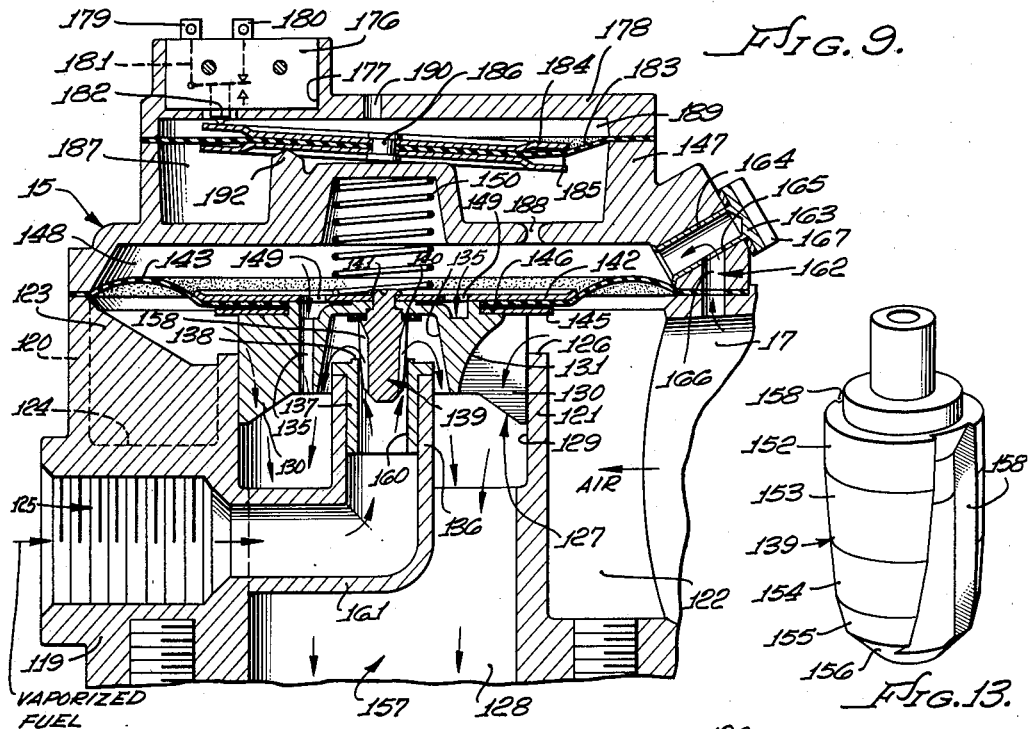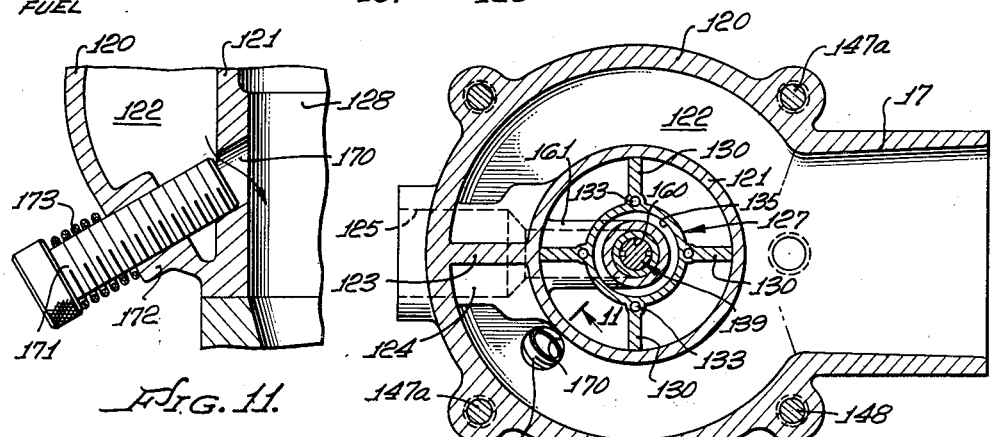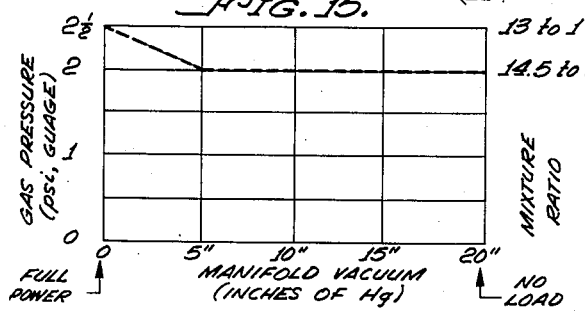

United States Patent Office 3,123,451
Patented Mar. 3, 1964

3,123,451
LPG FUEL SYSTEM FOR INTERNAL COMBUSTION ENGINES
Richard Baverstock, North Long Beach, Calif., assignor to Imperial Machine Products Co., South Gate, Calif., a corporation of California
Filed Oct. 16, 1959, Ser. No. 846,852
9 Claims. (Cl. 48—184)

Liquified petroleum gas comprising butane or propane or mixtures thereof is commonly used in vapor form as a fuel for internal combustion engines. It is the general object of this invention to provide an improved fuel system for delivering a combustible mixture of air and vaporized LPG to the intake manifold of an internal combustion engine. Another object of this invention is to provide such an improved system which includes a novel form of vaporizer and regulator for converting the liquid to vaporized fuel at a predetermined pressure, and a novel form of mixer device for mixing the vaporized fuel with air. A more detailed object is to provide a novel form of pressure sensitive device for actuating a liquid fuel shut-off valve whenever the engine ceases to operate.

Other and more detailed objects and advantages will appear hereinafter.

Referring to the drawings:

FIGURE 1 is a schematic plan view showing components in the system for supplying a combustible mixture of air and liquid petroleum gas to an internal combustion engine.

FIGURE 2 is a sectional elevation showing details of the vaporizer and regulator, the regulator valve being shown in open position.

FIGURE 3 is a plan view showing the device of FIGURE 2, the upper portion thereof being removed to expose the labyrinth path for vaporizing the fuel.

FIGURE 4 is a sectional plan view taken substantially on the lines 4—4 as shown in FIGURE 2.

FIGURE 5 is a sectional detail taken substantially on the lines 5—5 as shown in FIGURE 2.

FIGURE 6 is an exploded perspective view partly in section showing details of construction of the regulator valve.

FIGURE 7 is a plan view of the regulator diaphragm.

FIGURE 8 is a sectional elevation of the air fuel mixer device and the pressure sensitive device for actuating an electric switch, the parts being shown in closed position.

FIGURE 9 is a sectional view similar to FIGURE 8, the parts being shown in open position.

FIGURE 10 is a sectional plan view taken substantially along the lines 10—10 as shown in FIGURE 8.

FIGURE 11 is a sectional detail taken substantially on the lines 11—11 as shown in FIGURE 10.

FIGURE 12 is a sectional detail taken substantially on the lines 12—12 as shown in FIGURE 8.

FIGURE 13 is a perspective view showing the fuel valve plug on an enlarged scale.

FIGURE 14 is a perspective view of the air valve member.

FIGURE 15 is a graph showing operation of the device.

Referring to the drawings, the LPG fuel system shown diagrammatically in FIGURE 1 includes a supply pipe 10 leading from a tank (not shown) containing liquified petroleum gas. An electrically operated shut-off valve 11 prevents leakage of fluid through the pipe 10 when the engine is not running. The pipe 12 connects the shut-off valve 11 with the vaporizer and regulator generally designated 13 which acts to convert liquid fuel to vaporized fuel at a predetermined low pressure. Vaporized fuel passes through the pipe 14 connecting the regulator 13 to the mixer 15. Atmospheric air passing through a conventional air cleaner 16 is delivered to the mixer 15 through the air inlet pipe 17. A combustible mixture of air and vaporized fuel passes downward from the mixer 15 and as shown in FIGURE 8 passes into a flanged tubular member 18 having a conventional throttle valve 19 mounted therein. The lower flange 20 of the member 18 is adapted for connection to the inlet manifold (not shown) of an internal combustion engine.

The regulator generally designated 13 includes a base 25 having inlet opening 26 for connection to the fuel pipe 12. The base 25 has a horizontal passage 27 extending from the inlet 26 and communicating with the vertical passage 28 extending centrally through the seat 29. Parallel upstanding walls 30 and 31 formed integrally on the base 25 define a central cavity 32 therebetween and the valve lever 33 is positioned within this cavity. The valve lever is pivotally supported on a stationary pivot pin 34 passing through aligned apertures 35 and held in place in a groove 36 provided on a post 37 formed integrally with the base 25. This post projects upward between the parallel side flanges of the valve lever 33, and a retainer screw 38 on the post prevents displacement of the pivot shaft 34 from the groove 36. The screw 38 may be installed and removed through the opening between the side flanges of the lever. A resilient pad 40 formed of synthetic rubber or the like is carried on the cross bar 41 of the valve lever 33 in position to contact the seat 29 to prevent liquid flow into the cavity 32 from the fuel passage 28. The pad 40 is preferably cut from an extruded strip, and may be installed or replaced on the cross bar 41 without requiring the use of tools. The rear projecting end of the lever 33 is slotted as shown at 43 to receive the reduced portion 44 of the vertically movable diaphragm shank 45. Disassembly is prevented by means of the cross bar 46 at the extreme lower end of the shank 45.

The walls 30 and 31 are curved as shown at 48, 49, near the rear slotted end of the lever 33 and a central discharge slot 50 separates the curved ends 51 and 52 of the walls 30 and 31. This slot 50 comprises a discharge passage connecting the valve lever cavity 32 with the labyrinth passages 53 and 54. Labyrinth passages 53 and 54 are defined between the smooth outer surfaces of the walls 30 and 31 and the smooth inner surface of the crescent shaped upstanding wall 55 formed integrally on the base 25. Additional labyrinth passages 59 and 60 are defined between the smooth surface 61 of the outer wall 62 and the smooth outer surface 63 of the crescent shaped wall 55. The centrally positioned discharge port 64 communicates with the labyrinth passages 59 and 60 and connects with the threaded socket 65 which receives the threaded end of the pipe 14.

From this description it will be understood that fuel passes into the valve lever cavity 32 from the passageways 27 and 28 and then passes through discharge slot 50 and separates into two flow streams. One passes through labyrinth passages 53 and 59 to the discharge port 64 and the other passes through labyrinth passages 54 and 60 to the same discharge port 64.

The bottom surfaces of the labyrinth passages are formed by the base member 25 and the upper surfaces are formed by the porous member 66 confined between the circular cover plate 67 and the upper ends of the walls 30, 31, 55 and 62. The cover plate 67 is mounted within a circular bore 68 provided in the upper portion of the base member 25. This cover plate is clamped in position by means of the bonnet 69 which also clamps the outer periphery of the flexible diaphragm 70 to the base member 25. Threaded fastenings 71 connect the bonnet 69 to the base member 25 and extend through apertured ears 72 provided on the diaphragm 70.

The diaphragm post 45 is provided with a cylindrical section 74 terminating in a flange 75. The upper surface of this flange 75 forms an abutment 77. The lower surface of the diaphragm 70 rests on this abutment 77 and the hollow projection 78 extends through the central aperture of the diaphragm and through a similar aperture in the back-up plate 79. The end of the projection 78 is rolled outward to fix the back-up plate 79 to the diaphragm shank 45 and to clamp the diaphragm 70 against the abutment 77.

A floating washer 81 has a central opening 82 which slidably receives the cylindrical portion 74 of the diaphragm shank 45. This washer 81 is positioned above the porous disk 66 and below the stationary circular plate 67. The surface 82 of washer 81 slides on the shank 45 and seals against the under side of the plate 67, allowing some lateral motion of the shank 45 without binding in the opening 83 in the plate 67. The porous disk 66 prevents the washer 81 from dropping into the valve lever cavity 32. The central opening 83 is large enough to allow the flange 75 of the diaphragm shank to pass freely therethrough.

The tortuous or labyrinth paths provided for the fuel in its course from the seat opening 28 to the discharge port 64 not only act to maintain liquid droplets in contact with the walls by centrifugal action but also provide sufficient contact surface area to introduce the required heat into the fuel so that it leaves the outlet port 64 in fully vaporized condition with a minimum of entrainment of liquid droplets or mist. The walls defining the labyrinth passages are heated by means of hot water which circulates within channels formed internally of the walls. Thus, hot water, which may be obtained from the cooling system of the engine, is introduced into the base 25 through the threaded opening 90. This water passes through channels 91, 92, 93 in the walls 62, 55, 31 and 30 respectively and emerges at the threaded discharge connection 94. Experience has shown that a portion of the fuel is vaporized at the time it passes from the valve lever cavity 32 through slot 50 into the passages 53 and 54. A major portion has been vaporized by the time the fuel enters the labyrinth passages 59 and 60 and all of the fuel is in vaporized form when it leaves the base 25 through the discharge port 64.

The pressure of the vaporized fuel at the outlet 64 is communicated to the space above the circular plate 67 and below the diaphragm 70 through the opening 84. Atmospheric pressure exists in the chamber 88 above the diaphragm 70, since the bonnet 69 is provided with aperture 89 which is open to atmosphere. A coil spring 90 engages under the stationary abutment 91 of the bonnet 69 and acts against the back-up plate 79 resting on the upper surface of the diaphragm 70. The force of the spring plus the force produced by the atmospheric pressure acting over the upper surface of the diaphragm tend to move the diaphragm downward into contact with the stationary circular plate 67. Pressure of vaporized fuel adjacent the outlet 64 acts against the under side of the diaphragm in opposition to the force of the spring and the force developed by the atmospheric pressure. When the pressure of the vaporized fuel reaches a predetermined magnitude, for example, 2 pounds per square inch, the diaphragm 70 is raised against the force of the spring 90, thereby lifting the slotted end 43 of the lever 33 and enclosing the resilient pad 40 against the seat 29. When the pressure of vaporized fuel adjacent the outlet 64 falls below the predetermined value of pressure intensity, the diaphragm 70 moves down, thereby raising the valve from the seat 29. This action serves to regulate the pressure of vaporized fuel discharged through outlet 64. The pressure sensing opening 84 in the plate is placed in communication with the outlet 64 to insure that the pressure of vaporized fuel at the outlet remains substantially constant over a major portion of the range of flow rates. At high rates of flow, pressure in the cavity 32 may be higher than at the outlet 64, due to pressure drop through the tortuous passages. However, the pressure at the outlet 64 remains at 2 p.s.i. in a particular installation as shown by the graph of FIGURE 15 for the range from 5" vacuum to 20" vacuum. For full load operation of the engine, that is, in the range from 5" vacuum to 0", the pressure at the outlet 64 may be increased above 2 p.s.i., as described below.

Means are provided for raising the pressure at the outlet 64 whenever the suction pressure in the intake manifold of the engine falls below a predetermined value, for example, 5" of mercury, as shown on the chart of FIGURE 15. This means includes a diaphragm 100 clamped between the bonnet 69 and the cap 101 by means of threaded fastenings 102. A plunger 103 secured to the diaphragm 100 and back-up plate 104 passes loosely through opening 105 in the abutment 91 of the bonnet 69. A coil spring 106 encircles the plunger and extends from the abutment 91 to a shoulder 107 provided on the plunger. Whenever the engine is operating above 5 inches of vacuum suction pressure, this pressure as communicated to the chamber 108 acts above the diaphragm 100 to cause the plunger 103 to raise against the action of the spring 106, thereby lifting the lower end of the plunger 103 away from the upper end of the diaphragm shank 45. Should the suction pressure drop below 5 inches of mercury the spring 106 acts to move the plunger 103 downward into contact with the part 45, supplementing the force of the spring 90, and tending to open the valve 40. At full power of the engine, corresponding to zero suction pressure, the pressure of vaporized fuel at the outlet 64 is increased to about 2½ p.s.i. gage. This serves to richen the air-fuel mixture for heavy load conditions.

The porous disk 66 is formed of non-metallic flexible foraminous material having a relatively rough external surface. Material known in the art as "plastic foam" is admirably suited to this purpose. The myriad interstices and the rough surface prevent droplets from being carried along the surface toward the outlet 64. The disk forms a seal between adjacent parts of the labyrinth paths.

The presence of water in the passages in the base 25 presents the danger of breakage of the base member by forces developed if the water should freeze. This possibility is present when the vehicle is operated in cold climates or if water circulation is interrupted while the engine is operating. Accordingly to prevent breakage by expansion of ice under freezing conditions, I provide expansion means which are normally inactive but which function under the abnormally high pressure produced by ice formation to allow additional space for expansion and thus to prevent damage. I provide a metal bottom plate 110 which is secured to the lower exposed face of the base member 25 by means of suitable threaded fastenings, not shown. This bottom plate is provided with a U-shaped cavity 111, partly divided by a straight rib 112 terminating in a central boss 113. A sponge rubber filler 114 fits loosely in the cavity. A gasket 115 covering the entire area of the bottom plate 110 rests upon this filler 114 and upon the rib 112 and boss 113. A relief port 116 in the cavity 111 extends to atmosphere. The rubber filler 114 resists the normal water pressure in the channels 91, 92, and 93, but deforms under extremely high pressures as developed by ice formation to conform more closely to the shape of the cavity 111. Upon melting of the ice, the rubber filler 114 returns to its previous shape within the cavity 111.

As shown in FIGURE 7 the diaphragm 70 is provided with a tab-like projection 118 and this projection is adapted to cover the recess 119a provided in the outer wall of the base member 125. To connect diaphragm shank 45 with the slotted end of the valve lever 33, the diaphragm is placed on the base member 25 in a position one-quarter turn from its normal operating position. The lug 46 will then pass downward through the slot 43 in the valve lever 33. Subsequent turning of the diaphragm 70 to bring the tab 118 into registry with the recess 119a serves to prevent disassembly of the diaphragm shank 45 and valve lever 33.

The mixer 15 includes a housing 119 having concentric upstanding walls 120 and 121 defining a generally annular space 122 therebetween. The air inlet 17 communicates with this space 122 and the vortex-preventing rib 123 connects the walls and interrupts the annular space only to the extent of its width. A boss 124 around the fuel inlet 125 also projects into the annular space 122 to some extent, but the space 122 between the walls 121 and 120 remains essentially annular.

The upper end of the inner circular wall 121 terminates in an annular seat 126 and an air valve member 127 cooperates with this seat to control the pressure drop of air from the annular space 122 into the interior of the wall 121 and into the discharge opening 128.

The interior of the upper portion of the inner wall 121 is provided with a bore 129 for loose fit sliding reception of the outer edges of the four vanes 130 which extend radially from the air valve member 127. These vanes guide the valve member 127 for axial movement and guide the converging airstream to prevent formation of a vortex. The outer surface 131 of the air valve member 127 converges downward in the direction of flow and this surface is interrupted by the four bosses 132 and the guide vanes 130 which extend from them. The bosses 132 contain the axially extending openings 133 which project through the air valve member 127 from top to bottom.

The air valve member is provided with a downward facing cup-shaped recess 135 which is centrally positioned and which flares outward in the direction of flow. A stationary hollow post 136 projects upward into this recess and the post carries a bushing 137 at its upper end which provides a fuel valve seat 138. A fuel valve element 139 including a resilient ring 140 is fixed centrally of the air valve member 127 by deforming the upper end 141 thereof. An upper stem on the valve plug 139 extends through aligned apertures in the air valve member 127 and in the diaphragm backing plate 142 of the flexible diaphragm 143. The deformed upper end 141 of this stem thus serves to clamp the valve plug 139, resilient ring 140, air valve member 127 and backing plate 142 together so that these parts move as a unit.

A loose floating ring 145 is carried on the horizontal shoulder 146 of the air valve member 127 and this ring is adapted to rest on the seat 126 to form a seal. The outer peripheral portion of the circular diaphragm 143 is clamped between the housing 119 and the bonnet 147 by means of threaded fastenings 147a but the inner portion of the diaphragm 143 is loosely received in the annular space between the floating ring 145 and the diaphragm backing plate 142 and hence floats laterally for perfect alignment of the air and fuel valves with their respective seats. The bonnet 147 cooperates with the diaphragm 143 to define a space 148 and this space communicates through apertures 149 in the backing plate 142 and through the axial openings 133 in the air valve member 127 with the mixing chamber within the wall 121 and leading to the discharge opening 128. Accordingly, the upper surface of the diaphragm 143 is subjected to pressure in the discharge opening 128, while the lower face is subjected to pressure of the air inlet 17. A coil spring 150 within the space 148 acts to move the air valve member 127 toward closed position.

The fuel valve element 139 has a cylindrical portion 152 adjacent its upper end and a series of tapered sections 153, 154, 155 and 156 extending toward the bottom end thereof. In addition, diametrically positioned slots 158 which extend axially of the valve element are provided which interrupt the cylindrical and tapered external surfaces. The plug element 139 moves axially within the bore 160 of the stationary bushing 137 to control the rate of flow of vaporized fuel from the inlet 125 into the central cup-like cavity 135 in the air valve member 127. Vaporized fuel passes from the inlet 125 through the horizontal tube 161 and hollow post 136. The tube 161 and the hollow post 136 are positioned within the wall 121 of the housing 119.

From this description it will be understood that the air valve member 127 and the fuel valve element 139 move axially as a unit in response to flow of air and vaporized fuel admitted into the mixing chamber 157 within the wall 121 and into the discharge opening 128. Intimate and thorough mixing of vaporized fuel and air is achieved because the vaporized fuel passes downward in an annular expanding ring emerging from the flaring surface of the recess 135, while air passes downward and inward along the converging surface 131 of the air valve member 127. Vortex action of the air is prevented by the rib 123 and the vanes 130. A reduction in presure within the discharge opening 128 is reflected through the openings 133 into the space 148 above the diaphragm 143 with the result that the diaphragm lifts the air valve member 127 and fuel valve element 139 upward against the action of the coil spring 150.

Means are provided for adjusting the richness of the fuel mixture throughout the speed range of the engine. As shown in the drawings this means includes a passage 162 between the air inlet 17 and the space 148 above the diaphragm 143, together with a valve 163 to restrict the passage to any desired degree. This valve may take the form of a tubular member 164 having a port 165 which may be aligned to any extent desired with a bore 166 communicating with the air inlet 17. Turning of the exposed head 167 of the tubular member 164 serves to provide any degree of restriction desired. A reference mark 168 on the head may cooperate with indicia 169 on the bonnet 147. The effect of the valved passage 162 is to supplement the force of the spring 150 tending to close the air valve and fuel valve, and because the gas is supplied at a pressure greater than atmospheric pressure, the gas flow is reduced more than the air flow, thus serving to lean the mixture.

Additional means are provided for adjusting the richness of fuel mixture at idle speed and as shown on the drawings this means takes the form of a smooth bore 170 extending through the inner wall 121 (see FIGURE 11). This opening establishes communication from the annular air space 122 to the discharge opening 128. A machine screw 171 threaded in the boss 172 provides a means of restricting the opening 170, and a spring 173 encircling the exposed portion of the machine screw serves to hold it in selected position. Maximum richness of mixture is achieved when the restriction is greatest. This adjustment is principally effective at idle speed.

Considering the overall fuel system, it is important that the fuel supply be positively shut off when the engine ceases to operate, to prevent leakage and avoid danger of a fire. This shut off is accomplished by means of a conventional type electrically operated valve 11 connected in series with a battery 175 and an electric switch 176. The electric switch 176 may be mounted in a pocket 177 provided in a cap 178 for the bonnet 147. The switch terminals 179 and 180 project out of the pocket 177. Internal mechanism generally designated 181 serves to close an electric path between the terminals 179 and 180, whenever the contact element 182 is actuated.

A diaphragm 183 is clamped between the cap 178 and bonnet 147 and is positioned between circular metal plates 184 and 185 clamped to the diaphragm 183 by means of the central fastener 186. A cavity 187 is formed below the diaphragm 183 and this cavity communicates with the space 148 by way of the port 188. The space 189 above the diaphragm 183 is vented to atmosphere through port 190. Accordingly, the lower side of the diaphragm 183 is subjected to pressure in the outlet opening 128 by way of the opening 133, 149 and space 148, while the upper side of the diaphragm 183 is subjected to atmospheric pressure through port 190. A stationary post 192 is located within the chamber 187 in an off-center position between the central fastener 186 and the location of the switch element 182. When the engine is running, the pressure in the discharge passage 128 is lower than atmospheric pressure and therefore the diaphragm 183 is drawn downward into the cavity and tilted by reason of its contact with the stationary guide post 192. The tilting action causes the upper plate 184 to engage the element 182 of the switch 186, thereby closing the circuit through the battery 175 and electrically operated valve 11, and the leverages produce a force-multiplying action. Closing of the electric circuit opens the valve to allow flow of liquid fuel therethrough. When the engine ceases operation the pressures across the diaphragm 183 are equalized and the resilient diaphragm returns to a generally horizontal position, separating the upper plate 184 from the switch element 182. The electric circuit is broken and the valve 11 is closed by an internal spring, not shown.

Having fully described my invention, it is to be understood that I do not wish to be limited to the details herein set forth but my invention is of the full scope of the appended claims.

I claim:

1. In an air-fuel mixer device, the combination of: a housing having an air inlet and having an annular wall defining a discharge passage centrally therein, said annular wall having a seat at one end thereof, an air valve member mounted for axial movement in the housing toward and away from the seat, a fuel valve element fixed concentrically within the air valve member and movable as a unit therewith, a fuel supply conduit terminating in a central stationary tubular part having an axial opening, said axial opening co-operating with said fuel valve element to control flow of fuel into said discharge passage, an annular ring mounted concentrically on said air valve member for limited axial movement with respect thereto and engageable with said annular seat, a backing plate fixed on said air valve member and spaced axially with respect to said ring, a flexible diaphragm secured to the housing on its periphery and having a central portion loosely received in the space between said ring and said backing plate for radial self-aligning movement, and means subjecting said diaphragm on one face to air pressure in said inlet and on the other face to pressure in the discharge passage.

2. The combination set forth in claim 1 wherein at least one opening extends through the air valve member and the diaphragm to subject said other face of the diaphragm to pressure in the discharge passage.

3. The combination set forth in claim 1 wherein a compression spring interposed between the housing and the backing plate acts to move both the air valve member and the fuel valve element toward closed position.

4. In an air-fuel mixer device, the combination of: a housing having concentric walls, the inner wall defining a discharge passage centrally therein, an air inlet communicating with the space between said walls, a rib extending radially between said walls at a location remote from said air inlet, said inner wall having a seat at one end thereof, an air valve member mounted for axial movement in the housing toward and away from the seat and having means thereon engageable with the seat to form a seal, a plurality of axially extending radial vanes on the periphery of said air valve member sliding in said bore and serving to prevent vortex action of the air entering said discharge passage, a fuel valve element fixed concentrically within the air valve member and movable as a unit therewith, a fuel supply conduit terminating in a central stationary tubular part having an axial opening, said axial opening co-operating with said fuel valve element to control flow of fuel into said discharge passage, a flexible diaphragm secured to the housing on its periphery and having a central portion connected to the air valve member and movable therewith, and means subjecting said diaphragm on one face to air pressure in said inlet and on the other face to pressure in the discharge passage.

5. The combination set forth in claim 4 wherein at least one opening extends through the air valve member and the diaphragm to subject said other face of the diaphragm to pressure in the discharge passage.

6. In an air-fuel mixer device, the combination of: a housing having an air inlet and having a stationary annular wall defining a discharge passage centrally therein, said annular wall having a seat at one end thereof, an air valve member mounted for axial movement in the housing toward and away from the seat and having means thereon engageable with the seat to form a seal, a fuel valve element fixed concentrically within the air valve member and movable as a unit therewith, a fuel supply conduit terminating in a central stationary tubular part having an axial opening, said axial opening co-operating with said fuel valve element to control flow of fuel into said discharge passage, a flexible diaphragm secured to the housing on its periphery and having a central portion connected to the air valve member and movable therewith, means subjecting said diaphragm on one face to air pressure in said inlet and on the other face to pressure in the discharge passage, the housing having means including a bypass bore establishing communication between said air inlet and said discharge outlet, and means movable into the bypass port for adjustably restricting flow through said bypass port.

7. In an air-fuel mixer device, the combination of: a housing having an air inlet and having an annular wall defining a discharge passage centrally therein, said annular wall having a seat at one end thereof, an air valve member mounted for axial movement in the housing toward and away from the seat and having means thereon engageable with the seat to form a seal, a fuel valve element fixed concentrically within the air valve member and movable as a unit therewith, means including a fuel supply conduit for delivering gaseous fuel at a pressure higher than the pressure in said air inlet, said fuel supply conduit terminating in a central stationary tubular part having an axial opening, said axial opening co-operating with said fuel valve element to control flow of fuel into said discharge passage, a flexible diaphragm secured to the housing on its periphery and forming one wall of a chamber within the housing, said diaphragm having a central portion attached to the air valve member and movable therewith, means subjecting the face of said diaphragm remote from said chamber to air pressure in said inlet, means subjecting the chamber to pressure in the discharge passage, said housing having a passageway communicating between said air inlet and said chamber, and adjustable means for restricting flow through said passageway.

8. The combination set forth in claim 7 wherein at least one opening extends through the air valve member and the diaphragm to subject the chamber to pressure in the discharge passage.

9. The combination set forth in claim 7 wherein a compression spring interposed between the housing and the backing plate acts to move both the air valve member and the fuel valve element toward closed position.

References Cited in the file of this patent

UNITED STATES PATENTS

| | | |
|---|---|---|
| 991,229 | Noyes | May 2, 1911 |
| 2,788,082 | Vanderpoel | Apr. 9, 1957 |
| 2,927,848 | Baverstock | Mar. 8, 1960 |